United States Patent
Taylor et al.

(10) Patent No.: US 10,690,922 B2
(45) Date of Patent: Jun. 23, 2020

(54) SUPER-RESOLUTION SCANNING DISPLAY FOR NEAR-EYE DISPLAYS

(71) Applicant: Facebook Technologies, LLC, Menlo Park, CA (US)

(72) Inventors: Byron Taylor, Redmond, WA (US); Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 230 days.

(21) Appl. No.: 15/953,317

(22) Filed: Apr. 13, 2018

(65) Prior Publication Data

US 2019/0317329 A1 Oct. 17, 2019

(51) Int. Cl.
G02B 26/08 (2006.01)
G02B 27/01 (2006.01)
G02B 26/10 (2006.01)

(52) U.S. Cl.
CPC ....... *G02B 27/0172* (2013.01); *G02B 26/105* (2013.01); *G02B 2027/0147* (2013.01); *G02B 2027/0178* (2013.01)

(58) Field of Classification Search
CPC .............. G02B 27/0172; G02B 26/105; G02B 2027/0178; G02B 2027/0147; G02B 27/42; G02B 26/10; G02B 27/01

USPC ........................................................ 359/204.4
See application file for complete search history.

(56) References Cited

U.S. PATENT DOCUMENTS

2017/0236464 A1* 8/2017 Koshihara ............ G09G 3/2003
345/694

* cited by examiner

*Primary Examiner* — Euncha P Cherry
(74) *Attorney, Agent, or Firm* — Fenwick & West LLP

(57) ABSTRACT

A super-resolution scanning display. The scanning display includes a light source, a conditioning assembly, and a scanning mirror assembly. The light source is configured to emit source light from a plurality of columns of emitters formed along a first dimension, including at least a first column of emitters emitting in a first band of light and a second column of emitters emitting in a second band of light which are offset along the first dimension by a fraction of an emitter width and offset along a second dimension—that is orthogonal to the first dimension—by greater than the emitter width. The conditioning assembly receives and conditions the source light. The scanning mirror assembly scans the conditioned light along the second dimension to generate a portion of an image at a first location with a resolution that is more than a first threshold number of emitters in a unit angle in the first dimension.

20 Claims, 7 Drawing Sheets

SUPER-RESOLUTION SCANNING DISPLAY FOR NEAR-EYE DISPLAYS

BACKGROUND

This disclosure relates generally to a near-eye display (NED), and in particular, to scanning displays with super-resolution for NEDs.

Conventional displays are typically a two dimensional (2D) grid of emitters. In conventional 2D displays, the resolution is effectively the size (diameter) of the source 'emitter'—which would be scaled by the focal length into angular space for a projector display or NED configuration. However, a grid arrangement of emitters does not always provide optimal resolution.

SUMMARY

This disclosure describes a scanning display. The scanning display comprises a light source and an optics system. The optics system includes at least a conditioning assembly and a scanning mirror assembly. The light source is configured to emit source light from a plurality of columns of emitters (e.g., light emitting diode (LED), micro light emitting diode, vertical-cavity surface-emitting laser (VCSEL), photonics integrated circuit (PIC) output, SLED, VCSEL with phosphors, etc.) formed along a first dimension, with each column of emitters comprising one or more emitters arranged along a second dimension—orthogonal to the first dimension. The plurality of columns of emitters includes at least a first column of emitters configured to emit in a first band of light and a second column of emitters configured to emit in a second band of light. The conditioning assembly receives the source light and conditions (e.g., collimates, adjust apparent emitter offset, etc.) the source light.

In some embodiments, the first column of emitters and the second column of emitters are offset along the first dimension by a fraction of an emitter width (e.g., width of an area of the emission surface of the emitter) and offset along a second dimension—that is orthogonal to the first dimension—by a distance that is greater than the emitter width. In alternate embodiments or in addition to having an actual offset in emitter spacing, the conditioning assembly is configured to condition the source light such that conditioned light from the first column of emitters is offset from conditioned light of the second column of emitters in the first dimension by a fraction of an emitter width.

The scanning mirror assembly scans the conditioned light along the second dimension to generate a portion of an image at a first location. The portion of the image is generated from a first number of active emitters per unit solid angle which can be defined as the resolution of the portion of the image. The first number of active emitters is greater than that would occur using, e.g., emitters arranged in a densely packed grid. Accordingly, a perceived resolution of the portion of the image is improved as the perceived resolution is less than the emitter width, and this improvement in perceived resolution is referred to as super-resolution. The improvement in resolution referring to super-resolution of the portion of the image has a resolution that includes more than a threshold of active emitters per unit solid angle. The first location can be an entrance to an output waveguide of a NED that operates in an artificial reality environment.

Figure 1:
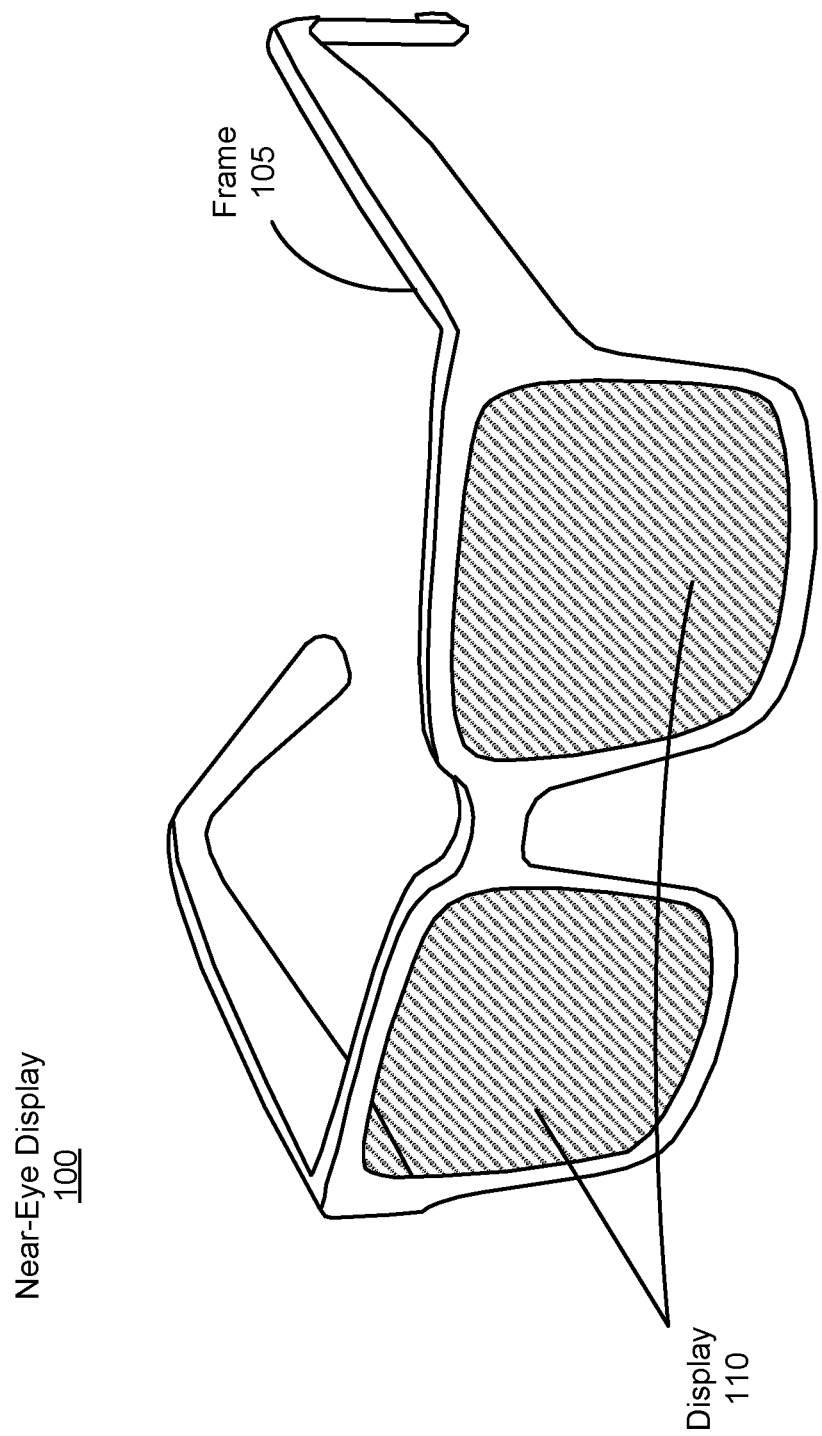
FIG. 1 is a perspective view of a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a near-eye display (NED) connected to a host computer system, a standalone NED, a mobile device or computing system, or any other hardware platform capable of providing artificial reality content to one or more viewers.

The NED includes at least a frame and a display. The NED of the artificial reality system presents visual content (e.g., generated visual content, real-world visual content, or some combination thereof) via the display to a wearing user. The artificial reality system can provide additional content (e.g., audio, haptic sensations, etc.) through the NED or other various devices (e.g., applications, processes, devices, accessories, etc.) in tandem with the visual content from the NED for constructing an immersive artificial reality environment. Some embodiments of the display of the NED comprises at least a waveguide assembly, which includes a super-resolution scanning display and an output waveguide. Other embodiments of the display of the NED comprise a combiner assembly to direct light from a super-resolution scanning display. Various combiner assemblies may include, but not limited to, a free-space combiner, polarized beam combiner, grating based combiner, including volume Bragg gratings, or a holographic combiner. The super-resolution scanning display generates image light in super-resolution corresponding to visual content rendered by the NED of the artificial reality system. In embodiments of the NED with the output waveguide, the output waveguide directs the image light from the super-resolution scanning display towards the wearing user.

The super-resolution scanning display includes a light source and an optics system, which includes a conditioning assembly and a scanning mirror assembly. The light source of the scanning display is an array of emitters, where each line of emitters corresponds to a respective line in an image ultimately displayed to the wearing user. Note that the array of emitters is substantially longer in one dimension than it is in an orthogonal (i.e., scanning) dimension. For example, 100s-1000s of emitters may be linearly arranged in a row, but there may only be ~10 rows in the array of emitters. The emitter array is comprised of a plurality of columns of emitters formed along a first dimension arranged along a second dimension (i.e., the scanning dimension)—orthogonal to the first dimension. In some embodiments, adjacent columns of emitters are offset along the first dimension by a fraction of an emitter width (e.g., width of an area of the emission surface of the emitter) and offset along the second dimension by a distance that is greater than the emitter width. In alternate embodiments or in addition to having an actual offset in emitter spacing, the conditioning assembly is configured to condition the source light such that conditioned light from the first column of emitters is offset from conditioned light of the second column of emitters in the first dimension by a fraction of an emitter width. The scanning mirror assembly includes one or more scanning mirrors that scan along at least the second dimension (and in some cases also the first dimension) to redirect the conditioned light. For example, the scanning mirror assembly can implement scanning mirror(s) to scan in 0, 1, or 2 moving dimensions. In additional embodiments, the scanning mirror assembly scans the conditioned light such that there is a resulting offset between adjacent rows of image light in the second dimension which is less than the emitter width. The super-resolution scanning display generates image light with super-resolution in at least the first dimension based on the emitter spacing. Super-resolution in at least the first dimension has more than a threshold number of active emitters per unit solid angle (e.g., more than 1 active emitter per 2 arcminutes of solid angle). In further embodiments, the super-resolution scanning display generates image light with super-resolution not only in the first dimension but also in the second dimension based on the scanning by the scanning mirror assembly. In these additional embodiments, super-resolution in the second dimension has more than a threshold number of active emitters per unit solid angle (e.g., more than 1 active emitter per 2 arcminutes of solid angle). The super-resolution scanning display may then direct image light onto an entrance location of the output waveguide to direct the image light to the wearing user.

FIG. 1 is a perspective view of a near-eye-display (NED) 100 (also referred to as a Head-Mounted Display (HMD)), in accordance with one or more embodiments. The NED 100 presents media to a user. Examples of media presented by the NED 100 include at least one of images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIGS. 2 & 3, the display 110 includes at least one waveguide assembly including a super-resolution scanning display to generate image light to present media to an eye of the user. The super-resolution scanning display includes a light source and an optics system. Other embodiments of the display 110 include at least one combiner assembly for directing image light from the super-resolution scanning display.

Figure 2:
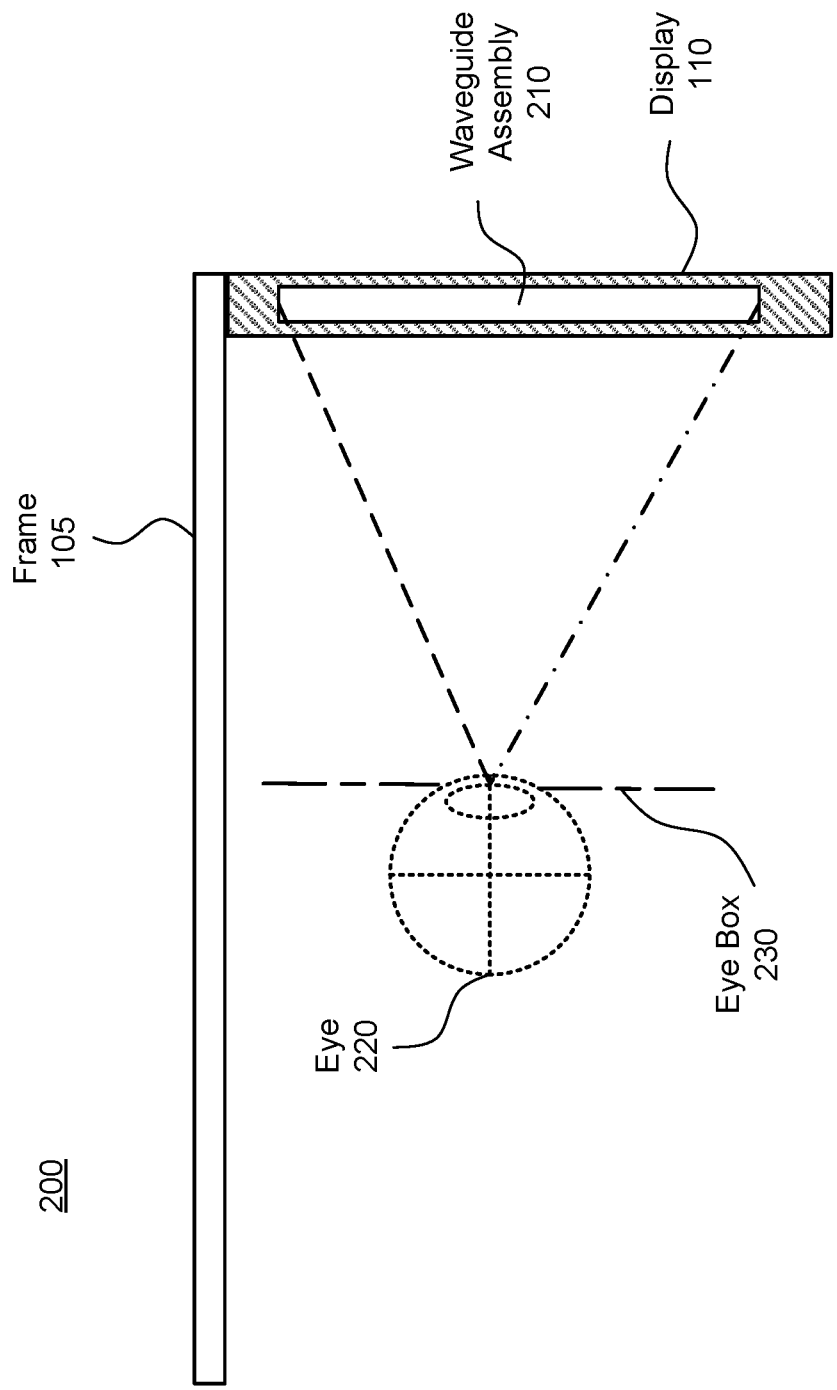
FIG. 2 is a cross sectional view of an eyewear of the NED illustrated in FIG. 1, in accordance with one or more embodiments.

FIG. 2 is a cross sectional view 200 of the NED 100 illustrated in FIG. 1, in accordance with one or more embodiments. The cross sectional view 200 illustrates at least one waveguide assembly 210 and an eye box 230. The eye box 230 is a location where the eye 220 is positioned when a user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown in this illustration, another waveguide assembly which is separate from the waveguide assembly 210, provides image light to another eye of the user.

The waveguide assembly 210, as illustrated below in FIG. 2, is configured to direct the image light to the eye 220 through the eye box 230. The waveguide assembly 210 may be composed of one or more materials (e.g., plastic, glass, etc.) with one or more refractive indices that effectively minimize the weight and couple an overlaid or presented field of view (hereinafter abbreviated as 'FOV') of the NED 100. In alternate configurations, the NED 100 includes one or more optical elements between the waveguide assembly 210 and the eye 220. The optical elements may act to, e.g., correct aberrations in image light emitted from the waveguide assembly 210, magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, a reflector, or any other suitable optical element that affects image light.

The waveguide assembly 210 includes a super-resolution scanning display to generate image light with super-resolution and an output waveguide to direct image light with super-resolution to the user's eyes. The super-resolution scanning display includes a light source and an optics system, with the optics system including a conditioning assembly and a scanning mirror assembly. Combinations of the light source, the conditioning assembly, and the scanning mirror assembly contribute in generating image light with super-resolution or effectively an increased number of active emitters per unit solid angle. In one embodiment, the super-resolution image light has 1 arcminute per active emitter in a first direction. In another embodiment, the super-resolution image light has 2 arcminutes per active emitter in a second direction. Embodiments of super-resolution scanning displays will be described further in conjunction with FIGS. 3-6.

Figure 3:
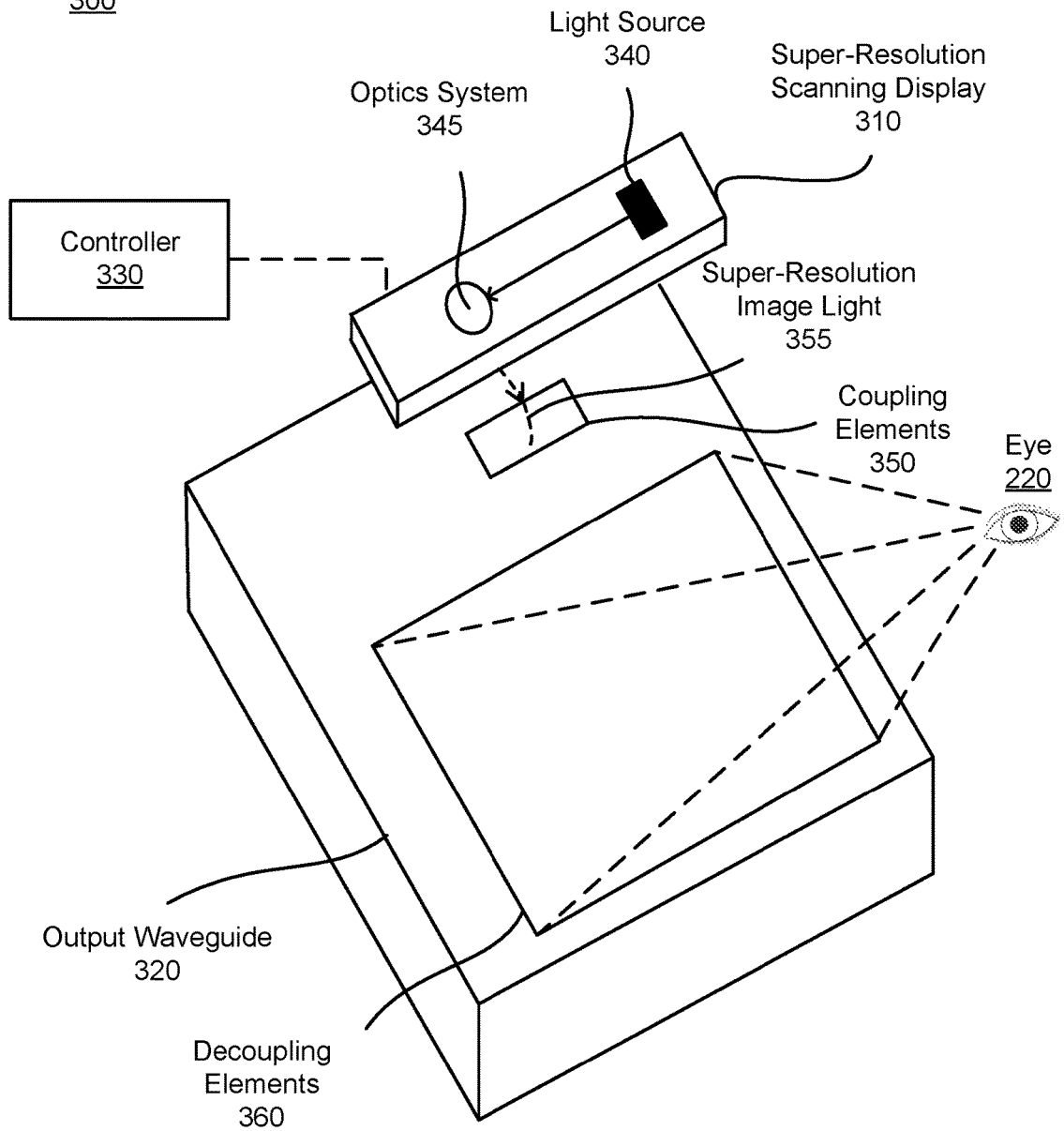
FIG. 3 illustrates an isometric view of a waveguide assembly, in accordance with one or more embodiments.

FIG. 3 illustrates an isometric view of a waveguide assembly 300, in accordance with one or more embodiments. In some embodiments, the waveguide assembly 300 is a component (e.g., waveguide assembly 210) of the NED 100. In alternate embodiments, the waveguide assembly 300 is part of some other NED, or other system that displays image light to a particular location.

The waveguide assembly 300 includes a super-resolution scanning display 310, an output waveguide 320, and a controller 330. For purposes of illustration, FIG. 3 shows the waveguide assembly 300 associated with a single eye 220, but in some embodiments, another waveguide assembly separate (or partially separate) from the waveguide assembly 300, provides image light to another eye of the user. In a partially separate system, one or more components may be shared between waveguide assemblies for each eye.

The super-resolution scanning display 310 generates super-resolution image light 355. The super-resolution scanning display 310 includes a light source 340 and an optics system 345. The light source 340 is an optical component that generates light using a plurality of emitters placed in an array. In some embodiments, the light source 340 has the plurality of emitters arranged with columns of emitters which are offset by a fraction of an emitter width in a first dimension and offset by at least an emitter width in a second dimension—orthogonal to the first dimension. The fractional offset in columns of emitters influences resolution of super-resolution image light 355 emitted by the super-resolution scanning display 310 as the fractional offset provides an increase in active emitters in a unit angle in one dimension. In some configurations, a portion of the light source 340 generates a first band of wavelengths and another portion of the light source 340 generates a second band of wavelengths. Embodiments of the light source 340 will be further described in FIGS. 4-6.

The optics system 345 performs a set of optical processes, including, but not restricted to, focusing, combining, collimating, transforming, conditioning, and scanning processes on the image light generated by the light source 340. The optics system 345 includes a conditioning assembly and a scanning mirror assembly which are not illustrated in FIG. 3. In additional embodiments, the scanning mirror assembly scans conditioned light such that the scanned light is offset or further offset in one or both dimensions. For example, scanned conditioned light is offset in the first dimension and/or the second dimension by a fraction of the emitter width, thus influencing resolution of super-resolution image light 355 in the first dimension and/or the second dimension. Embodiments of the conditioning assembly and the scanning mirror assembly will be further described in FIGS. 4-6. The super-resolution scanning display 310 generates and outputs super-resolution image light 355 with super-resolution—influenced by at least one of the light source 340, the conditioning assembly, and the scanning mirror assembly—to one or more coupling elements 350 of the output waveguide 320.

The output waveguide 320 is an optical waveguide that outputs images to the eye 220 of the user. The output waveguide 320 receives the super-resolution image light 355 at one or more coupling elements 350, and guides the received input super-resolution image light 355 to one or more decoupling elements 360. In some embodiments, the one or more coupling elements 350 couple the super-resolution image light 355 from the super-resolution scanning display 310 into the output waveguide 320. The one or more coupling elements 350 may include, e.g., an input surface, a diffraction grating, a holographic grating, some other element that couples the super-resolution image light 355 into the output waveguide 320, or some combination thereof. For example, in embodiments where the coupling elements 350 include a diffraction grating, the pitch of the diffraction grating is chosen such that total internal reflection occurs as a result, and the super-resolution image light 355 propagates internally toward the one or more decoupling elements 360. In one example, the pitch of the diffraction grating may be in the range of 300 nm to 600 nm.

The one or more decoupling elements 360 decouple the total internally reflected image light from the output waveguide 320. The one or more decoupling elements 360 may include, e.g., a diffraction grating, a volume Bragg grating, a holographic grating, some other element that decouples image light out of the output waveguide 320, or some combination thereof. For example, in embodiments where the one or more decoupling elements 360 include a diffraction grating, the pitch of the diffraction grating is chosen to cause incident image light to exit the output waveguide 320. An orientation and position of the light exiting from the output waveguide 320 is controlled by changing an orientation and position of the super-resolution image light 355 entering the one or more coupling elements 350. For example, the pitch of the diffraction grating may be in the range of 300 nm to 600 nm.

The output waveguide 320 may be composed of one or more materials that facilitate total internal reflection of the super-resolution image light 355. The output waveguide 320 may be composed of e.g., plastic, glass, or polymers, or some combination thereof. The output waveguide 320 has a relatively small form factor. For example, the output waveguide 320 may be approximately 50 mm wide along x-dimension, 40 mm long along y-dimension and 0.5-2.0 mm thick along z-dimension.

The controller 330 controls the scanning operations of the super-resolution scanning display 310. The controller 330 determines scanning instructions for the super-resolution scanning display 310 based at least on the one or more display instructions. Display instructions are instructions to render one or more images. In some embodiments, display instructions may simply be an image file (e.g., bitmap). The display instructions may be received from, e.g., a console of a NED system (not shown here). Scanning instructions are instructions used by the super-resolution scanning display 310 to generate super-resolution image light 355. The scanning instructions may include, e.g., a type of a source of image light (e.g., monochromatic, polychromatic), a scanning rate, an orientation of a scanning apparatus, one or more illumination parameters (described below with reference to FIG. 4A), or some combination thereof. The controller 330 includes a combination of hardware, software, and/or firmware not shown here so as not to obscure other aspects of the disclosure.

Figure 4A:
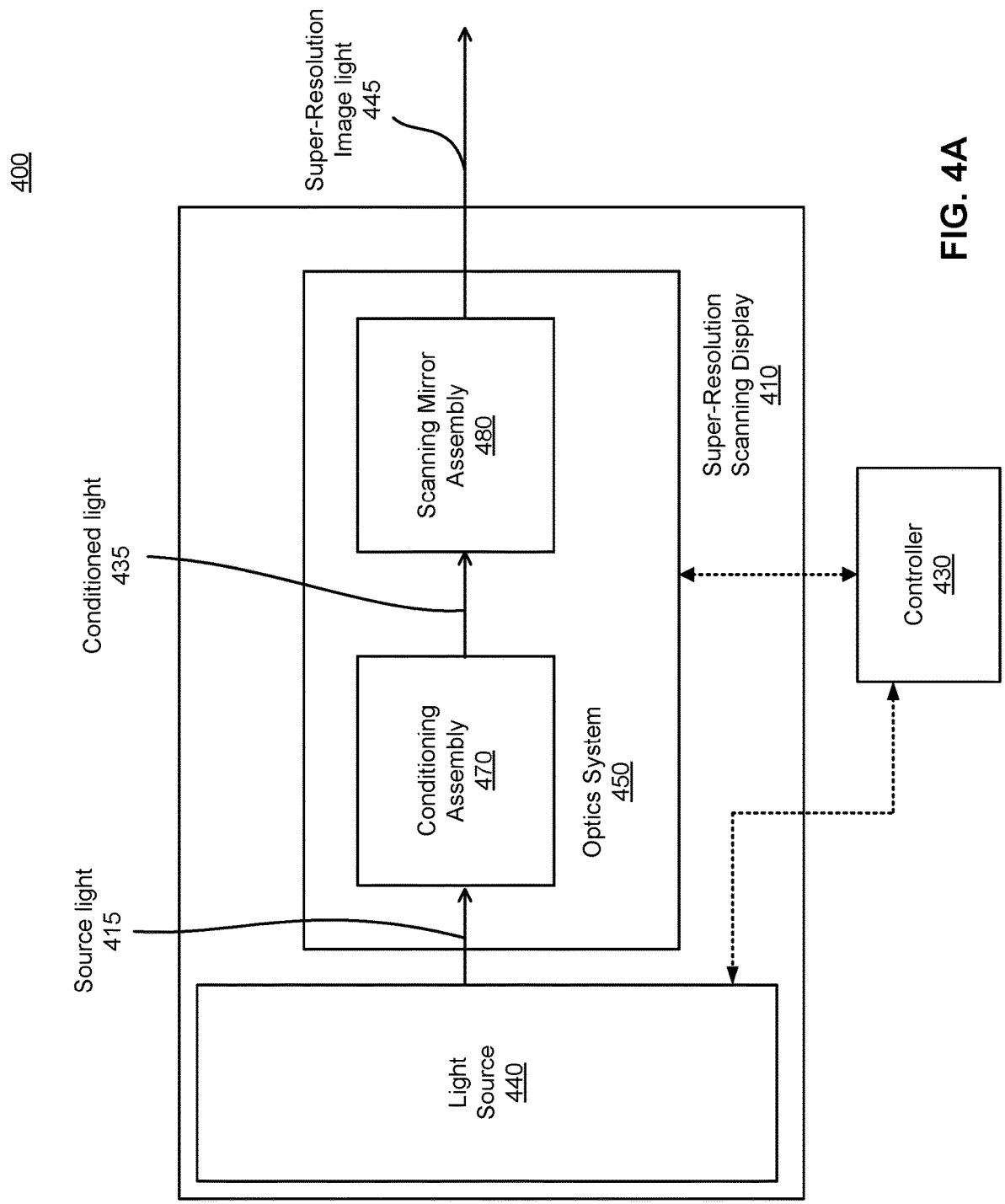
FIG. 4A is a block diagram overviewing a super-resolution scanning display with a controller, in accordance with one or more embodiments.

FIG. 4A is a block diagram 400 overviewing a super-resolution scanning display 410 with a controller 430, in accordance with one or more embodiments. The super-resolution scanning display 410 is an embodiment of the super-resolution scanning display 310, it includes a light source 440 and an optics system 450. The light source 340 is an embodiment of the light source 440; the optics system 345 is an embodiment of the optics system 450; and the controller 330 is an embodiment of the controller 440.

The super-resolution scanning display 410 generates super-resolution image light 445 in accordance with scanning instructions from the controller 430. The super-resolution scanning display 410 includes a light source 440 and an optics system 450. The light source 440 is a source of light that generates the desired wavelength, numerical aperture, emission size, and other characteristics needed in the source light 415. The optics system 450 comprises at least a conditioning assembly 470 and a scanning mirror assembly 480. The conditioning assembly 470 conditions the source light 415 into conditioned light 435, and the scanning mirror assembly 480 scans the conditioned light 435. The super-resolution scanning display 410 generates super-resolution image light 445 with super-resolution in at least one dimension dependent on at least the light source 440. Additionally the super-resolution in the one dimension may depend on one of the conditioning assembly 470 and the scanning mirror assembly 480. The super-resolution image light 445 may be coupled to an entrance of an output waveguide (e.g., one or more coupling elements 350 of the output waveguide 320 of FIG. 3).

The light source 440 emits light in accordance with one or more illumination parameters received from the controller 430. An illumination parameter is an instruction used by the light source 440 to generate light. An illumination parameter may include, e.g., source wavelength, pulse rate, pulse amplitude, beam type (continuous or pulsed), other parameter(s) that affect the emitted light, or some combination thereof.

The light source 440 comprises a plurality of emitters, wherein each emitter may be, e.g., a superluminous LED, a laser diode, a vertical cavity surface emitting laser (VCSEL), a light emitting diode (LED), an organic LED (OLED), a microLED, a tunable laser, or some other light source that emits coherent to non-coherent light. The emitters of the light source 440 emit light in a visible band (e.g., from about 390 nm to 700 nm), and they may emit light in accordance with one or more illumination parameters. In some embodiments, the super-resolution scanning display 410 comprises multiple light sources each with its own array of emitters emitting light in a distinct wavelength such that when scanned, light emitted from each of the light sources are overlapped to produce various wavelengths in a spectrum. Each emitter of the light source 440 comprises an emission surface from which a portion of source light is emitted. The emission surface may be identical for all emitters or may vary between emitters. An emitter width is a width of an area of the emission surface. The emission surface may have different shapes (e.g., circular, hexagonal, etc.). For example, an emitter which is a microLED with a circular emission surface may have an emitter width of five (5) micrometers characterized as a diameter of the circular emission surface.

The plurality of emitters of the light source 440 is arranged as an array of emitters. The array of emitters comprises a plurality of columns of emitters formed along a first dimension, wherein each column of emitters is a one-dimensional linear array of emitters arranged along a second dimension—orthogonal to the first dimension. There are substantially more columns of emitters than there are emitters in each column of emitters, e.g., there are ~1000 columns of emitters with each column of emitters having ~10 emitters. Each column of emitters corresponds to a respective column in an image ultimately displayed to the user. Resolution of the source light 415 in the first dimension depends at least in part on an offset between adjacent columns of emitters. The arrangement of the array of emitters of the light source 440 thereby influences resolution of the super-resolution image light 445 generated by the super-resolution scanning display 410.

In one or more embodiments, the light source 440 with its array of emitters is arranged with offsets between adjacent columns of emitters which contribute to generating super-resolution image light 445. These offsets between adjacent columns include a first offset by a fraction of the emitter width in the first dimension and a second offset by at least the emitter width in the second dimension. The first offset by the fraction of the emitter width in the first dimension effectively improves resolution of the source light 415. This fractional offset arrangement of adjacent columns of emitters of the light source 440 thereby contributes to providing super-resolution to the super-resolution image light 445 emitted by the super-resolution scanning display 410.

In additional embodiments, the light source 440 comprises additional components (e.g., drivers, phantom memory, heat sinks, etc.). In one or more embodiments, the light source 440 comprises additional components (e.g., a plurality of drivers) that are electrically coupled to the array of emitters. And one or more of these additional components (e.g., a driver for each emitter) are around emitters in a column of emitters. The drivers provide circuitry for controlling the array of emitters. The plurality of drivers relay illumination parameters received from the controller 430 to electrically tune each emitter in the array of emitters. The phantom memory act as temporary storage medium when scanning. The heat sinks help dissipate heat from the electrical circuitry.

The conditioning assembly 470 conditions source light 415 from the light source 440. Conditioning the source light 415 may include, e.g., expanding, collimating, focusing, distorting emitter spacing, polarizing, adjusting orientation for an apparent location of an emitter, correcting for one or more optical errors (e.g., field curvature, chromatic aberration), some other adjustment of the light, or some combination thereof. The conditioning assembly 470 comprises one or more optical components (e.g., lenses, mirrors, apertures, gratings, etc.).

In one or more embodiments, the conditioning assembly 470 conditions the source light 415 so as to produce offsets between adjacent columns of conditioned light 435 corresponding to adjacent columns of source light 415 which contribute to the super-resolution image light 445. The conditioning which influences resolution of the super-resolution image light 445 can be defined as a field dependent magnification change which may comprise at least some amount of focusing, some amount of distorting emitter spacing, some amount of adjusting an apparent location of the emitter, or some combination thereof.

In one embodiment, the field dependent magnification change may produce distortions in emitter spacing. In additional configurations, the field dependent magnification may reduce emitter width through focusing the source light. The resulting array of emitters of the conditioned light 435 comprise a plurality of columns of emitters formed along a first dimension with adjacent columns of emitters having a first offset in the first dimension by a fraction of the emitter width. With a similar principle as that described for the light source 440, the distortion in emitter spacing of adjacent columns in the first dimension—alone or in combination with reduction of emitter width—effectively improves resolution of the conditioned light 435 in the first dimension.

The scanning mirror assembly 480 includes one or more optical elements that redirect light via one or more reflective portions of the scanning mirror assembly 480. Where the light is redirected toward is based on specific orientations of the one or more reflective portions. The one or more reflective portions of the scanning assembly may be planar or curved (e.g., spherical, parabolic, concave, convex, cylindrical, etc.). The scanning mirror assembly 480 scans along at least one dimension of the emitter array with the one dimension of the emitter array being substantially smaller. In some embodiments, the scanning mirror assembly 480 includes a single scanning mirror that is configured to scan in at least the second dimension (i.e., the dimension along which emitters in a column of emitters are formed). For example, the conditioned light 435 comprises a plurality of rows of emitters, wherein a row of emitters is substantially longer than a column of emitters, which are scanned successively row by row. In other embodiments, the scanning mirror assembly 480 may raster scan (horizontally or vertically depending on scanning direction). These other embodiments of the scanning mirror assembly 480 may utilize additional scanning mirrors to scan in 0, 1, or 2 moving dimensions.

In one or more embodiments, the scanning mirror assembly 480 produces, in scanning, offsets between linear arrays of emitters in the emitter array. Some embodiments utilize one or more curved reflective portions to achieve the offsets. Other embodiments utilize scanning techniques to achieve the offsets. In some embodiments, the scanning mirror assembly 480 performs a translational offset between periodic linear emitter arrays along a scan dimension such that periodic linear emitter arrays are offset by a fraction of the emitter width. For example, the scanning mirror assembly 480 is offsetting scanned rows of emitters, such that within a scanned column of emitters, there is an offset between adjacent emitters in the column of emitters which is a fraction of the emitter width. The reduction in emitter spacing between adjacent emitters in the columns of emitters to be the fraction of the emitter width provides super-resolution in the scanned dimension. In additional embodiments, the scanning mirror assembly 480 can produce an offset in two orthogonal dimensions of the scanned array such that both dimensions have offsets of fractions of the emitter width. With the same principle discussed above, the scanning array would have effectively super-resolution in two dimensions. The super-resolution scanning display 410 outputs super-resolution image light 445 in at least one dimension (e.g., the first dimension along which the columns of emitters are formed) which is based at least in part on one of emitter spacing by the light source 440 and emitter spacing as conditioned by the conditioning assembly 470. Additionally, the super-resolution image light 445 may be super-resolution in a second dimension, wherein the resolution is based at least in part on at least one of emitter spacing by the light source 440, the controller 430 timing output, and the scanning mirror assembly 480. The super-resolution image light 445 may couple to an output waveguide, e.g., the output waveguide 320 as described above with reference to FIG. 3.

In additional embodiments, varying portions of the super-resolution image light 445 have varying resolutions. In these embodiments, at least a first portion of the super-resolution image light 445 has a first resolution and a second portion of the super-resolution image light 445 has a second resolution. One or more of the first resolution and the second resolution is super-resolution. The first resolution is based at least in part on a first offset of emitter spacing of the first portion of the super-resolution image light 445. The second resolution is based at least in part on a second offset of emitter spacing of the second portion of the super-resolution image light 445. For example, a center region of the super-resolution image light 445 is super-resolution whereas a peripheral region of the super-resolution image light 445 is not super-resolution.

The controller 430 controls the light source 440 and the optics system 450. The controller 430 takes content for display, and divides the content into discrete sections. The controller 430 instructs the light source 440 to sequentially present the discrete sections using individual emitters corresponding to a respective column in an image ultimately displayed to the user. The controller 430 instructs one or both of the conditioning assembly 470 and the scanning mirror assembly 480—of the optics system 450—to condition and/or scan the presented discrete sections. The controller 430 can determine to what extent the conditioning assembly 470 and/or the scanning display 480 might effectively distort emitter spacing of discrete sections, such that varying discrete sections would have varying resolutions. The controller 430 controls the optics system 450 to direct the discrete sections of the super-resolution image light 445 to different areas, e.g., different portions of one or more coupling elements 350 of the output waveguide 320. Accordingly, at the eye box of the output waveguide, each discrete portion is presented in a different location. While each discrete section is presented at different times, the presentation and scanning of the discrete sections occurs fast enough such that a user's eye integrates the different sections into a single image or series of images. The controller 430 also provides the illumination parameters to the light source 440. Thus the controller 430 may control each individual emitter of the light source 440.

In comparison with conventional scanning displays, the super-resolution scanning display 410 provides image light with super-resolution. As discussed prior, conventional scanning displays provide image light without super-resolution. These conventional displays utilize grid-like arrangements of emitters as the light source; however, the grid-like arrangement limits resolution by requiring the emitter spacing to be greater than the emitter width. In addition, these grid architectures have inherent MTF nulls at the Nyquist frequency, due to the nature of a discrete sample of an analog scene. For instance, you can represent full black followed by full white/output only when it is perfectly aligned with the grid, otherwise gray results with no or very low contrast. However, the super-resolution scanning display 410 offsets emitters in the light source 440 and/or emitters through the conditioning assembly 470 and/or the scanning mirror assembly 480. The offsets prove capable of breaking through into super-resolution. There is a limitation of close packing of emitters such that a reduced offset in emitter spacing in one dimension, thereby limits offset in emitter spacing in an orthogonal dimension. To compensate for this limitation in emitter spacing in the orthogonal dimension, the super-resolution scanning display 410 can increase emitter brightness through illumination parameters. Additionally, the super-resolution scanning display 410 can utilize the conditioning assembly 470 and/or the scanning mirror assembly to effectively reduce the offset in the orthogonal dimension in processing the source light 415.

Figure 4B:
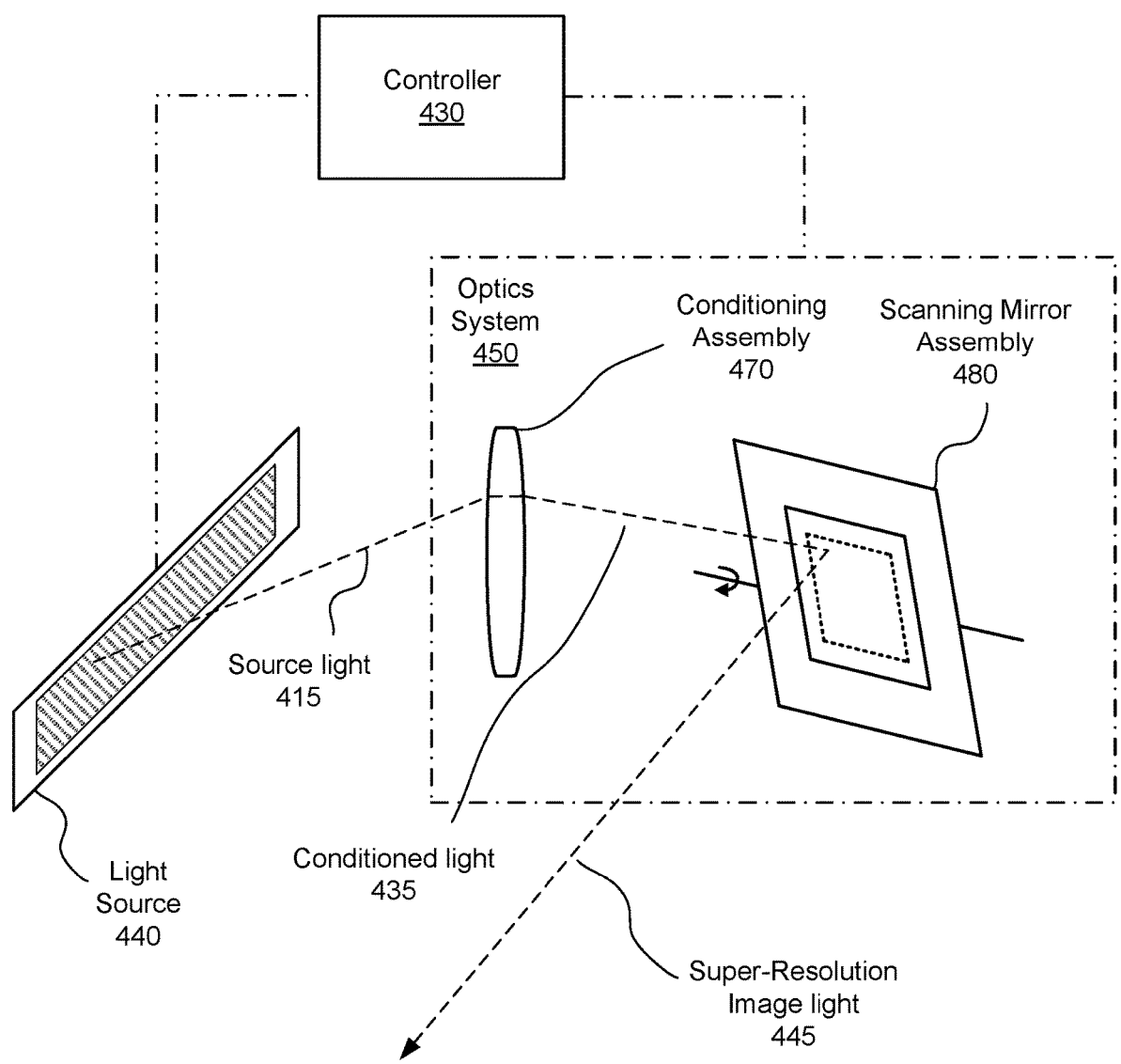
FIG. 4B illustrates the super-resolution scanning display and the controller of FIG. 4A, in accordance with one or more embodiments.

FIG. 4B illustrates the super-resolution scanning display 410 and the controller 430 of FIG. 4A, in accordance with one or more embodiments. The super-resolution scanning display 410 generates light in accordance with scanning instructions from the controller 430. The light source 440, as noted above, is substantially longer along one dimension. In one or more embodiments, the light source 440 comprises a plurality of columns of emitters with adjacent columns offset in the substantially longer dimension by a fraction of the emitter width. The offset in these one or more embodiments effectively produces source light 415 with super-resolution, in at least the substantially longer dimension. The optics system 450 receives the source light 415 and with the conditioning assembly 470 converts the source light 415 into conditioned light 435. In one or more embodiments, the conditioning assembly 470 conditions the source light 415 to produce conditioned light 435 which comprises a plurality of columns of emitters with adjacent columns of emitters offset. The offset in these one or more embodiments effectively produces conditioned light 435 with super-resolution, in at least one dimension. The conditioned light 435 is then scanned by the scanning mirror assembly 480. In one or more embodiments, the scanning mirror assembly 480 contributes to improving resolution of scanned light. The super-resolution scanning display 410 emits the super-resolution image light 445 with super-resolution, in one or more dimensions, based at least in part on one of emitter spacing by the light source 440, emitter spacing as a result of conditioning by the conditioning assembly 470, the controller 430 timing output, and emitter spacing as a result of scanning by the scanning mirror assembly 480. Although FIG. 4B presents a physical representation of the super-resolution scanning display 410 with its components in operation together, FIG. 4B is simply an illustrative demonstration of the principles discussed with regards to FIG. 4A.

Figure 5:
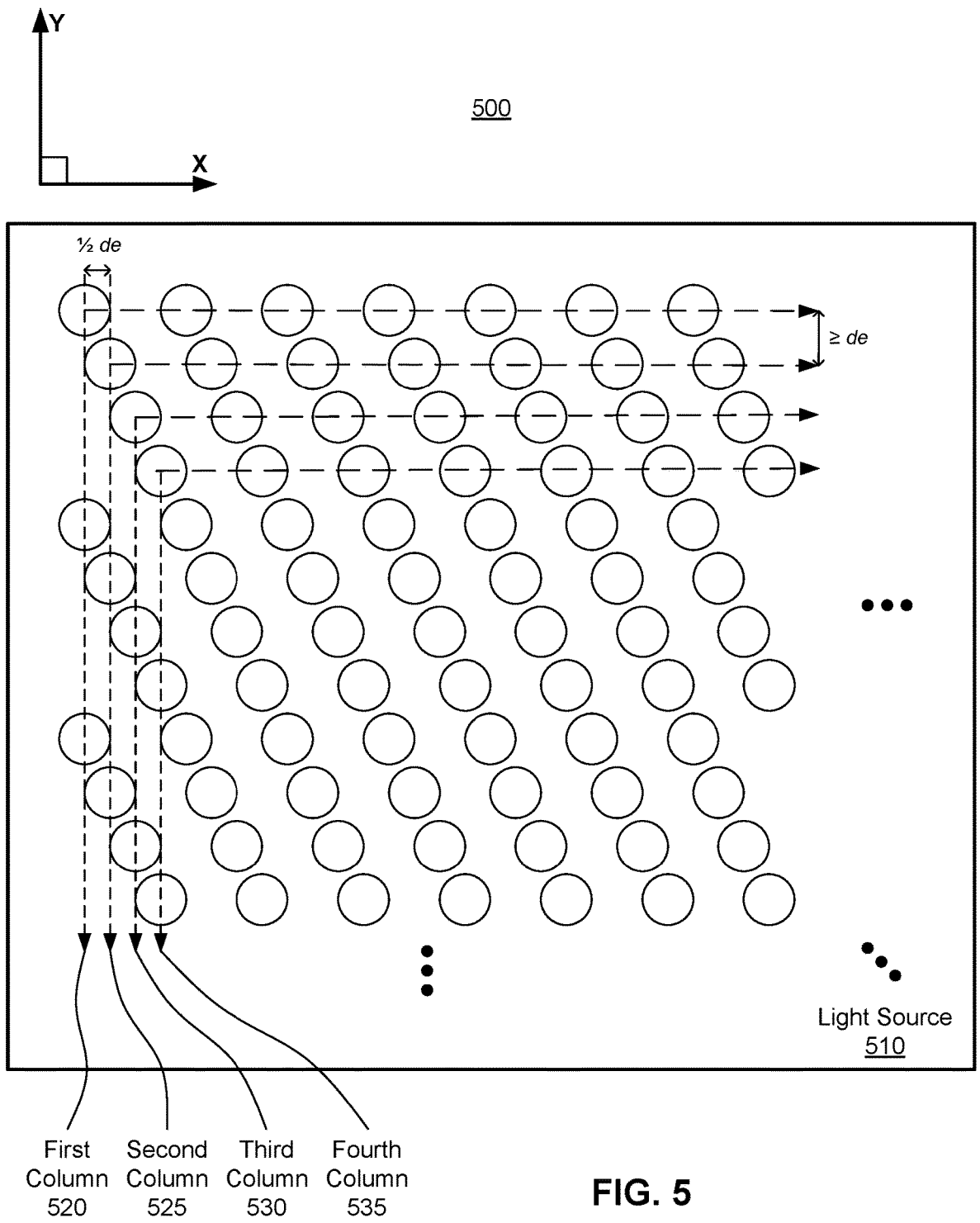
FIG. 5 is a planar view of a portion of a light source for the super-resolution scanning display of FIG. 4A, in accordance with one or more embodiments.

FIG. 5 is a planar view of a portion 500 of a light source 510 for the super-resolution scanning display 410 of FIG. 4A, in accordance with one or more embodiments. The light source 510 is an embodiment of the light source 440 of FIG. 4A. The light source 510 comprises an array of emitters that include a plurality of columns of emitters. The plurality of columns of emitters are formed along a first dimension; in this illustration, the columns of emitters are formed along the X dimension (e.g., the first dimension). Each column of emitters includes a plurality of emitters arranged along the Y dimension (e.g., the second dimension). In this embodiment, the plurality of columns of emitters includes at least a first column 520, a second column 525, a third column 530, and a fourth column 535 of emitters. In this embodiment, each column of emitters comprises at least three emitters with emitters in a column of emitters spaced out by more than an emitter width. More generally, each column of emitters comprises as least two emitters. As an example of what was mentioned above, there are substantially more columns of emitters than rows of emitters in this illustration (e.g., ~100s to 1000s of columns and ~10 rows). Between adjacent columns of emitters there is a first offset in the positive X dimension by a fraction of the emitter width (relating to the first offset along the first dimension as described in FIG. 4A) and a second offset in a negative Y dimension—orthogonal to the X dimension—by at least the emitter width (relating to the second offset along the second dimension as described in FIG. 4A). A portion of an image scanned by a scanning display with the light source 510 as a component has super-resolution in at least the X dimension. Additionally, the portion of the image scanned by the scanning display with the light source 510 has super-resolution in the Y dimension as achieved with timing control by the controller.

The emitters of the plurality of columns of emitters emit source light. The emitters comprise an emission surface from which source light is emitted towards a conditioning assembly, e.g., the conditioning assembly 470 of FIG. 4A. In this illustration, the emission surface of the emitters is circular. As such the emitter width may be defined as the emission surface's diameter represented as de. Emitters in a column of emitters can emit light at a same wavelength or at varying wavelengths. Similarly in between columns of emitters, columns of emitters can emit light at a same wavelength or at varying wavelengths.

The plurality of columns of emitters are arranged such that there is the first offset in the X dimension and the second offset in the Y dimension. In this illustration, between adjacent columns of emitters of the light source 510, the first offset in the positive X dimension is by a half of the emitter width, e.g., a half of de. Additionally, the second offset in the negative Y dimension is at least the emitter width. In this example illustration, the second offset is greater than the emitter width. In other embodiments, the first offset is another fraction of the emitter width, e.g., three-fourths the emitter width, two-thirds the emitter width, one-third the emitter width, one-fourth the emitter width, or some other fraction of the emitter width. In these embodiments, the second offset continues for adjacent columns of emitters with some periodicity. As seen by the illustration, the second offset occurs between the first column 520 and the second column 525, between the second column 525 and the third column 530, and between the third column 530 and the fourth column 535. Then after the fourth column 535, the next column of emitters has no offset in the Y dimension from the first column 520, thus restarting the second offset between adjacent columns. In this illustration, the second offset is periodic every four columns of emitters. In other embodiments, the periodicity of the second offset is different, e.g., the second offset is periodic every 3 columns, every 5 columns, every 6 columns, etc. The source light in the X dimension produced by the light source 510 has super-resolution based in part on the first offset in the X dimension. This improvement in resolution in at least the X dimension (e.g., first dimension) due to the first offset can be combined with resolution improvement through conditioning of the source light by a conditioning assembly (e.g., the conditioning assembly 470) which will be discussed in detail in FIG. 6. In tandem, the light source 510 and the conditioning assembly of the scanning display can provide image light with super-resolution in at least the X dimension (e.g., first dimension) with potential for super-resolution in the Y dimension as well (e.g., second dimension).

Figure 6:
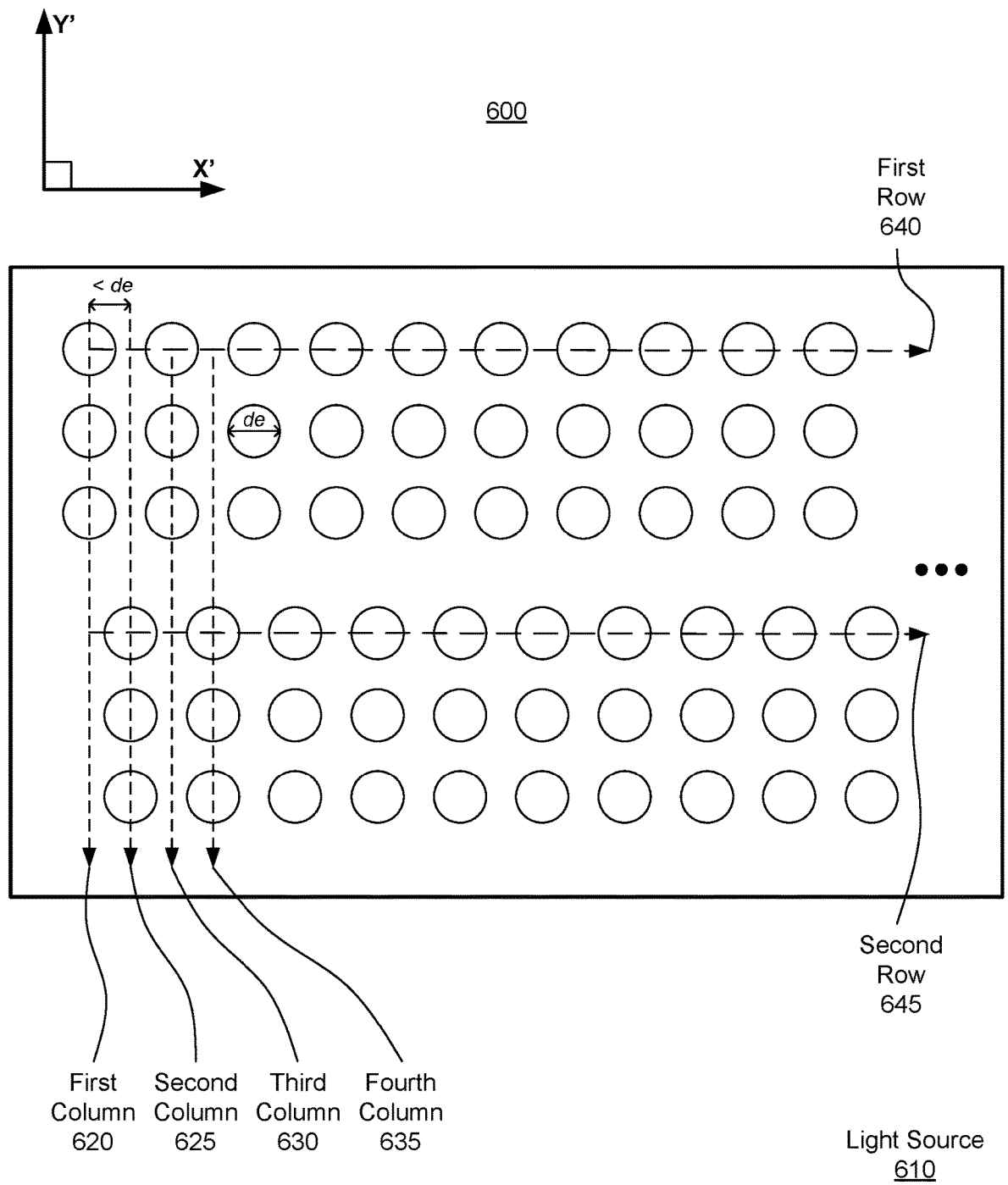
FIG. 6 is a planar view of another embodiment of a portion of a light source for the super-resolution scanning display of FIG. 4A, in accordance with one or more embodiments.

FIG. 6 is a planar view of a portion 600 of a light source 610 for the super-resolution scanning display of FIG. 4A, in accordance with one or more embodiments. The light source 610 is an embodiment of the light source 440 of FIG. 4A. The light source 610 comprises an array of emitters that include a plurality of columns of emitters. The plurality of columns of emitters are formed along a first dimension—in this illustration, the columns of emitters are formed along the X' dimension (e.g., the first dimension). Each column of emitters includes a plurality of emitters arranged along the Y' dimension (e.g., the second dimension). In this embodiment, the plurality of columns of emitters includes at least a first column 620, a second column 625, a third column 630, and a fourth column 635 of emitters. In this illustration, each column of emitters comprises three emitters, but more generally embodiments of the light source 440 may comprise at least two emitters per column of emitters. As an example of what was mentioned above, there are substantially more columns of emitters than rows of emitters in this illustration. Between adjacent columns of emitters there is a first offset in the X' dimension by a fraction of the emitter width (relating to the first offset along the first dimension as described in FIG. 4A). In this embodiment, adjacent columns of emitters are offset by a second offset in the Y' dimension by more than the emitter width such that the adjacent columns do not overlap in the Y' dimension. In one or more implementations, a scanning display scans a portion of an image with the light source 610 such that the portion of the image has super-resolution in at least the X' dimension.

The emitters of the plurality of columns of emitters emit source light. The emitters comprise an emission surface from which source light is emitted towards a conditioning assembly, e.g., the conditioning assembly 470 of FIG. 4A. In this illustration, the emission surface of the emitters is circular. As such the emitter width may be defined as the emission surface's diameter represented as de. Emitters in a column of emitters can emit light at a same wavelength or at varying wavelengths. Similarly in between columns of emitters, columns of emitters can emit light at a same wavelength or at varying wavelengths.

The plurality of columns of emitters are arranged such that there is the first offset in the X' dimension and the second offset in the Y' dimension. In this illustration, between adjacent columns of emitters of the light source 510, the first offset in the positive X' dimension is by a fraction of the emitter width. The second offset in the Y' dimension results in a separating of the plurality of columns of emitters. The separation creates a first subset of columns of emitters with odd numbered columns of emitters, e.g., inclusive of the first column 620, the third column 630, the fifth column (not labeled), etc., and a second subset of columns of emitters with even numbered columns of emitters, e.g., inclusive of the second column 625, the fourth column 635, the sixth column (not labeled), etc. The separation of odd and even numbered columns allows for further decrease in the first offset in the X' dimension between adjacent columns, providing potential for further improvements in resolution in at least the X' dimension (e.g., first dimension). A scanning mirror assembly utilized in conjunction with the light source 610 could scan the plurality of columns of emitters such that odd and even numbered columns are realigned eliminating the second offset in the Y' dimension of the scanned light. As the odd and even numbered columns are realigned, a first row 640 of scanned light from the odd numbered columns and a second row 645 of scanned light from the even numbered columns would become collinear. The scanned light from the first row 640 and the second row 645 would have super-resolution in the X' dimension.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A scanning display comprising:
a light source configured to emit source light from a plurality of columns of emitters that are formed along a first dimension, the plurality of columns of emitters including a first column of emitters that emit in a first band of light, and a second column of emitters that emit in a second band of light, and the first column of emitters is offset in the first dimension from the second column of emitters by a fraction of an emitter width, and offset in a second dimension that is orthogonal to the first dimension by a distance that is greater than the emitter width;
a conditioning assembly configured to condition the source light; and
a scanning mirror assembly configured to scan the conditioned source light along the second dimension to generate a portion of an image at a first location, wherein the portion of the image has a resolution that is more than a threshold number of emitters in a unit angle in at least the first dimension.

2. The scanning display of claim 1, wherein emitters of the light source are selected from a group consisting of: light emitting diodes (LEDs), organic LEDs (OLEDs), microLEDs, lasers, vertical-cavity surface-emitting lasers, or some combination thereof.

3. The scanning display of claim 1, wherein the first band of light is different from the second band of light.

4. The scanning display of claim 1, wherein the first band of light is the same as the second band of light.

5. The scanning display of claim 1, wherein the emitter width is a length of an emission surface of the emitter along the first dimension.

6. The scanning display of claim 5, wherein the emission surface is circular.

7. The scanning display of claim 1, wherein a resolution in the second dimension of the portion of the image is more than a second threshold number of emitters in a unit angle.

8. The scanning display of claim 1, wherein conditioning the source light comprises at least one of collimating the source light, focusing the source light, and transforming the source light.

9. The scanning display of claim 1, wherein the first location is an entrance to a waveguide of a near-eye display (NED).

10. The scanning display of claim 1, wherein the offset in the second dimension is further greater than a length of a column of emitters.

11. A scanning display comprising:
a first light source configured to emit source light in a first band of light, the first light source including a first plurality of columns of emitters that are formed along a first dimension, the first plurality of columns of emitters including a first column of emitters and a second column of emitters, and the first column of emitters is offset in the first dimension from the second column of emitters by a fraction of an emitter width, and offset in a second dimension that is orthogonal to the first dimension by a distance that is greater than the emitter width;
a second light source configured to emit source light in a second band of light, the second light source including a second plurality of columns of emitters that are formed along the first dimension, the second plurality of columns of emitters including a third column of emitters and a fourth column of emitters, and the third column of emitters is offset in the first dimension from the fourth column of emitters by a fraction of the emitter width, and offset in the second dimension by a distance that is greater than the emitter width;
a conditioning assembly configured to condition the source light from the first light source and the source light from the second light source; and
a scanning mirror assembly configured to scan the conditioned source light along the second dimension such that source light from the first light source overlaps with source light from the second light source to generate a portion of an image at a first location, wherein the portion of the image has a resolution that is more than a first threshold number of emitters in a unit angle in at least the first dimension.

12. The scanning display of claim 11, wherein emitters of the first light source and the second light source are selected from a group consisting of: light emitting diodes (LEDs), organic LEDs (OLEDs), microLEDs, lasers, vertical-cavity surface-emitting lasers, or some combination thereof.

13. The scanning display of claim 11, wherein the first band of light is different from the second band of light, wherein the portion of the image is formed from light in the first band and light in the second band.

14. The scanning display of claim 11, wherein the emitter width is a length of an emission surface of the emitter along the first dimension.

15. The scanning display of claim 11, wherein a resolution in the second dimension of the portion of the image is more than a second threshold number of emitters in a unit angle.

16. The scanning display of claim 15, wherein the first threshold number is 1 active emitter per 2 arcminutes of solid angle, and the second threshold number is 1 active emitter per 2 arcminutes of solid angle.

17. The scanning display of claim 11, wherein conditioning the source light comprises at least one of collimating the source light, focusing the source light, and transforming the source light.

18. The scanning display of claim 11, wherein the first location is an entrance to a waveguide of a near-eye display (NED).

19. The scanning display of claim 11, wherein the offset in the second dimension between the first column of emitters and the second column of emitters is further greater than a length of a column of emitters.

20. The scanning display of claim 11, wherein the resolution in the first dimension of the portion of the image is based in part on a combination of:
a timing of scanning of the conditioned source light along the second dimension by the scanning mirror assembly,
the offset between the first column of emitters and the second column of emitters formed along the first dimension in the first light source, and
the offset between the third column of emitters and the fourth column of emitters formed along the first dimension in the second light source.

* * * * *